US012696916B2

(12) United States Patent  
Lohse et al.

(10) Patent No.: US 12,696,916 B2  
(45) Date of Patent: Aug. 4, 2026

(54) PREPARATION OF A SOLID FLAVOUR COMPOSITION, A COMPOSITION, FOOD COMPRISING THE COMPOSITION AND A FLAVOUR IMPARTING METHOD

(71) Applicant: Givaudan SA, Vernier (CH)

(72) Inventors: Christian Lohse, Pfäffikon (CH); Ivan Helbling, Winterthur (CH)

(73) Assignee: GIVAUDAN SA, Vernier (CH)

( * ) Notice: Subject to any disclaimer, the term of this patent is extended or adjusted under 35 U.S.C. 154(b) by 170 days.

(21) Appl. No.: 18/227,662

(22) Filed: Jul. 28, 2023

(65) Prior Publication Data

US 2023/0363427 A1 Nov. 16, 2023

Related U.S. Application Data

(63) Continuation of application No. 16/347,453, filed as application No. PCT/EP2017/078158 on Nov. 3, 2017, now abandoned.

(30) Foreign Application Priority Data

Nov. 3, 2016 (GB) ..................................... 1618535

(51) Int. Cl.

| | |
|---|---|
| *A23L 5/30* | (2016.01) |
| *A23L 2/56* | (2006.01) |
| *A23L 27/00* | (2016.01) |

(52) U.S. Cl.

CPC ..... *A23L 5/34* (2016.08); *A23L 2/56* (2013.01); *A23L 27/88* (2016.08); *A23V 2002/00* (2013.01)

(58) Field of Classification Search

CPC .......... A23L 27/70; A23L 27/21; A23L 27/00; A23L 27/215; A23L 27/88; A23L 2/56; A23F 3/405; C12C 5/026; A23B 4/01

See application file for complete search history.

(56) References Cited

U.S. PATENT DOCUMENTS

| | | | | |
|---|---|---|---|---|
| 4,246,462 A | * | 1/1981 | Meisel ................... | H05B 6/782 |
| | | | | 219/746 |
| 5,108,770 A | | 4/1992 | Domingues et al. | |
| 6,129,937 A | | 10/2000 | Zurbriggen et al. | |
| 2006/0045954 A1 | | 3/2006 | Young et al. | |
| 2006/0286212 A1 | | 12/2006 | Yu | |
| 2014/0348991 A1 | | 11/2014 | Rabe et al. | |

FOREIGN PATENT DOCUMENTS

| | | |
|---|---|---|
| CN | 101263888 A | 9/2008 |
| CN | 101283775 A | 10/2008 |
| CN | 101756148 A | 6/2010 |
| CN | 102283365 A | 12/2011 |
| CN | 103564395 A | 2/2014 |
| CN | 104397661 A | 3/2015 |
| JP | 2005224201 A | 2/2004 |
| KR | 100250180 B1 | 4/2000 |
| WO | 2011117375 A1 | 9/2011 |

OTHER PUBLICATIONS

Great Britain Search Report for Application No. GB 1618535.7 dated Feb. 3, 2017.

International Search Report for Application No. PCT/EP2017/078158 dated Dec. 21, 2017.

International Written Opinion for Application No. PCT/EP2017/078158 dated Dec. 21, 2017.

International Preliminary Report on Patentability for Application No. PCT/EP2017/078158 dated May 7, 2019.

Cui, et al., "Preparation of dry honey by microwave-vacuum drying", Journal of Food Engineering, vol. 84, pp. 582-590, Jul. 20, 2007, Elsevier.

Feng, et al., "Effect of Water on the Quality of Dehydrated Products: A Review of Novel Characterization Methods and Hybrid Drying Technologies", Drying Technology, vol. 32, pp. 1872-1884, Oct. 6, 2014, Taylor & Francies Group.

Farrel, et al., "Microwave-Vacuum Drying Kinetics of Pharmaceutical Powders", vol. 23, No. 9-11, pp. 2131-2146, Sep. 1, 2005, Taylor & Francies Group.

Yaylayan, et al., "Chapter 38: Microwave and Thermally Induced Maillard Reactions", American Chemical Society, vol. 543, pp. 449-456, Nov. 30, 1993.

Josef Kerler et al. "Basic Chemistry and Process Conditions for reaction flavours with particular focus on Maillard-Type Reactions", Food Flavour Technology, Second Edition, 2010, Blackwell Publishing Ltd.

Cui, et al. "Dehydration of Garlic Slices by Combined Microwave-Vacuum and Air Drying", Drying Technology, vol. 21, Issue 7, pp. 1173-1184, 2003.

Anonymous, "askFSIS Public Q&A: What are Reaction Flavors?", U.S. Department of Agriculture, accessible at: https://ask.usda.gov/s/article/askFSIS-Public-Q-A-RF.

* cited by examiner

*Primary Examiner* — Vera Stulii

(74) *Attorney, Agent, or Firm* — Curatolo, Sidoti & Trillis Co., LPA; Floyd Trillis, III; Salvatore A. Sidoti

(57) ABSTRACT

A process of forming a reaction flavour solid composition, the process comprises the step of heating an aqueous slurry containing reaction flavour precursor compounds to form a reaction flavour, and concomitantly drying the slurry using microwave radiation to form a reaction flavour solid composition.

12 Claims, No Drawings

PREPARATION OF A SOLID FLAVOUR COMPOSITION, A COMPOSITION, FOOD COMPRISING THE COMPOSITION AND A FLAVOUR IMPARTING METHOD

CROSS REFERENCE TO RELATED APPLICATIONS

The present application is a continuation of U.S. application Ser. No. 16/347,453, having a 371(c) date of May 3, 2019, which is a national stage patent application of International Application No. PCT/EP2017/078158, filed on Nov. 3, 2017, which claims priority from Great Britain Patent Application No. 1618535.7, filed on Nov. 3, 2016, both of which applications are hereby incorporated herein by reference in their entireties.

FIELD

This invention relates to a method of forming reaction flavour solid compositions by means of microwave radiation; reaction flavour solid compositions made according to said method; and to foods or beverages containing said reaction flavour solid compositions.

BACKGROUND

Generating flavour and/or colour in foods by means of microwave cooking is known in the art, see for example EP 2 797 427, U.S. Pat. No. 4,940,592 or U.S. Pat. No. 5,053,236. Microwaves have also been used for drying, see e.g. CN 101263888 or CN 101283775. However, the extemporaneous generation of flavour and/or colour as a result of cooking food is distinct from the industrial production reaction flavours, which is essentially a process of preparing flavour compositions external of a food or beverage matrix.

A "reaction flavour" is an art recognised term that describes a flavour composition that can be used to impart, modify or improve the flavour of all manner of foods or beverages. They are formed by reacting reaction flavour precursor ingredients under controlled reaction conditions. A reaction flavour is not a food as such; it is an article of manufacture that is intended to be added to foods or beverages to impart flavour thereto, or to modify or improve flavour in a food or beverage. Reaction flavours are essentially non-nutritional, that is, their substantial purpose is to impart flavour to foods or beverages, or to enhance, modify or improve the flavour of food or beverages to which they are added, not to provide nutrition. Reaction flavour solid compositions are reaction flavours in the form of a solid, for example a powdered solid or paste.

Reaction flavour precursor ingredients employed in the preparation of reaction flavour solid compositions may have little or no flavour in and of themselves, this being developed or produced by a complex series of consecutive and/or competing reactions, such as Maillard reactions, Schiff base formation, Strecker degradation, caramelization reactions, and/or other reactions that are beneficial in the development of flavour and/or colour, all of which are well known to the person skilled in the art. Permitted precursor ingredients and recommended reaction conditions are set out in guidelines provided by regulatory authorities known to the person skilled in the art.

The use of a microwave for Maillard reactions has been described in e.g. CN 104397661, CN 101756148, CN 102283365 or CN 103564395.

A reaction flavour typically consists of a complex multi-component blend of both volatile and non-volatile reaction products, as well as any unreacted starting materials. In the production of a reaction flavour, its compositional make-up can be sensitive to reaction parameters and may vary in terms of its component parts, or in the pattern of distribution of those component parts. Important reaction parameters can include precursor ingredient chemistry, reaction time and temperature, moisture, pressure, pH, and the like. If one or more of these parameters is not controlled, the flavour profile and/or colouration of the reaction flavour can be adversely affected, for example by failure to convert all of the starting materials, or by the development of off-tastes.

In the industrial production of reaction flavours, the skilled person must not only take into account the foregoing reaction parameters or variables, it must also take into account process engineering considerations. For example, viscosity control in reaction media is an important process parameter, which on an industrial scale will impact operations such as pumping, stirring, blending and filtering, and to facilitate these operations, it is conventional to form reaction flavours in reaction media consisting of highly dilute aqueous slurries. Furthermore, in addition to controlling viscosity in this way, employing high levels of water can help control heat transfer and prevent over-heating or localized heating during reaction flavour formation.

The use of highly dilute slurries does have some disadvantages, however. Reaction flavours are usually presented commercially in the form of solid compositions. Reaction flavours in dry form are particularly important for reason of their physical and microbiological stability, as well as for supply chain considerations, such as ease of storage, handling, dosing, and the like. Removal of water from the reaction mixture once a reaction flavour is formed is therefore a critical process step.

Using conventional process conditions, after cooking a slurry to create a reaction flavour in a first step, the slurry is dehydrated in a second step by spray drying or vacuum oven drying. Spray drying is relatively inexpensive, but this technique does require the use of relative large amounts of carrier material, which can be detrimental to the flavour profile and mouth feel of a finished reaction flavour. More commonly, in the second step, dehydration is accomplished using vacuum oven drying. In this case, after preparing the reaction flavour, the slurry is transferred to drying trays and the trays are inserted into a vacuum oven, whereupon the water is evaporated by heating (usually below 100° C.) under reduced pressure. However, the time and energy required to dehydrate slurries in this way is rather wasteful of resources. The process is laborious, complex and expensive; and the dependency on long drying times and elevated temperatures means that without careful in-process control, the drying process can leave its imprint on the flavour quality and authenticity of reaction flavour solid compositions.

Nevertheless, reaction flavour solid compositions are easy to handle and have many uses as additives in foods or beverages, and are much desired by flavour manufacturers and food and beverage manufactures alike. There remains a need to provide an industrial method of forming reaction flavour solid compositions in a cost effective and efficient manner, which can deliver reaction flavour solid compositions exhibiting intense, authentic flavour profiles that are characteristic of, or improve upon, reaction flavour solid compositions formed by conventional processes.

SUMMARY OF THE INVENTION

In addressing the deficiencies in the prior art, the applicant discovered in a surprising manner that reaction flavours can be both formed and dehydrated in a single heating step using microwave radiation. The applicant is neither aware of any prior art process of forming reaction flavours in an aqueous slurry, whilst concomitantly dehydrating the slurry to form reaction flavour solid compositions, nor specifically, such a process carried out using microwave radiation.

The present invention provides in a first aspect a process of preparing a reaction flavour solid composition comprising the step of heating an aqueous slurry containing reaction flavour precursor compounds using microwave radiation.

In another aspect the invention provides a reaction flavour solid composition obtainable by a process comprising the step of heating an aqueous slurry containing reaction flavour precursor compounds using microwave radiation.

In another aspect the invention provides a food or beverage comprising a reaction flavour solid composition of the invention.

In yet another aspect the invention provides a method of imparting flavour to a food or beverage, or modifying or improving the flavour of a food or beverage, said method comprising the step of adding to said food or beverage a reaction flavour solid composition defined herein.

These and other aspects and embodiments of the invention will be further understood with reference to the following description and examples.

DETAILED DESCRIPTION OF THE INVENTION

The present invention is based on the surprising discovery that an aqueous slurry comprising reaction flavour precursor compounds can be converted to a reaction flavour and concomitantly dehydrated by means heating the slurry using microwave radiation. Thus, in contrast to the prior art, reacting and drying are performed in one and the same step. Microwave radiation provides the heat source to both form a reaction flavour in the slurry and to dehydrate the slurry, thereby to provide a reaction flavour solid composition.

The term "reaction flavour", as used throughout this disclosure, refers to a flavour composition that can be used to impart, modify or improve the flavour of all manner of foods or beverages. It is typically formed by reacting reaction flavour precursor ingredients under controlled reaction conditions. A "reaction flavour" is not a food as such; it is an article of manufacture that is intended to be added to foods or beverages to impart flavour thereto, or to modify or improve flavour in a food or beverage. The term "reaction flavour" is meant to encompass both "process flavours" and "flavouring preparations".

According to the EFFA Guidance Document on the EC Regulation on Flavourings, "thermal process flavours" are reaction flavours that are formed from reducing sugar and amino acids/amine sources. "Flavouring preparations", on the other hand, are handled as outlined in the "EFFA Guidance Document for the Production of Natural Flavouring Substances & (Natural) Flavouring Preparations in the EU.

The discovery that microwave radiation can be employed to form a reaction flavour in a slurry and to concomitantly dehydrate the slurry to form a reaction flavour solid composition, permits of much faster processing times than were heretofore possible using prior art processes of sequentially heating an aqueous slurry to form the reaction flavour in a first step, and thereafter carrying out a separate drying step in a conventional vacuum drying oven, or by spray drying.

Furthermore, by means of the present invention, it is possible to form reaction flavour solid compositions, which are highly reminiscent of reaction flavour solid compositions formed by conventional processes, but in much shorter periods of time. Still further, because the synthesis of the reaction flavour and drying of the slurry are carried out concomitantly, the chemistry of reaction flavour synthesis proceeds in a relatively low water content environment, enabling the formation of a variety and/or abundance of reaction flavour components, which hitherto could not be achieved using conventional processes.

In a conventional process, because a reaction flavour is formed in high water content reaction medium, and it is not desired to dehydrate the reaction medium, the temperature does not rise above 100° C., or possibly slightly higher (e.g. about 120° C.) if the reaction medium is under pressure because of the reaction being carried out in a closed vessel. By contrast, in accordance with the present invention, relatively low water content slurries can be employed initially, and the water content is reduced further due to dehydration. This results in shorter processing times and higher processing temperatures during the development of the reaction flavours. As a result of higher reaction temperature and lower reaction times, it is possible to create reaction flavours that offer completely new and interesting flavour profiles.

Indeed, the applicant has found it is possible to create reaction flavour solid compositions comprising an abundance and/or variety of important reaction flavour components, which is not achievable with conventional processes.

More particularly, the invention provides reaction flavour solid compositions comprising a surprising abundance and/or variety of reaction flavour components selected from ketopiperazines, piperazines, pyrrolizines, pyrazines, sulphides, thiols and maltol derivatives, and mixtures thereof. These reaction flavour components are particularly useful ingredients in all manner of reactions flavour solid compositions, but particularly those intended to deliver or contribute to savoury, poultry, roasted, crusty bread, toasted cheese, seared or animalic flavour notes.

The discovery that desirable reaction flavours can be formed and dehydrated with relatively short processing times and at relatively higher temperatures is indeed very surprising and counter-intuitive given that those skilled in the art of manufacturing reaction flavours would understand and accept that flavour and colour development depends upon adherence to established reaction variables discussed above, including time and temperature, and that the industry-standard cooking and drying steps (such as vacuum drying or spray drying) are critical in order to create desired flavour profiles of reaction flavour solid compositions.

In an embodiment of the present invention, the method of forming a reaction flavour solid composition, comprises the step of providing an aqueous slurry of reaction flavour precursor compounds containing water in amounts up to 50 wt %, in particular 10 to 50 wt %, more particularly 10 to 30 wt %, more particularly 15 to 30 wt %, and more particularly still 10 to 20 wt %, and applying microwave radiation thereto for a period of time sufficient to dehydrate the slurry and produce a reaction flavour solid composition.

After dehydration of the slurry, the resulting reaction flavour solid composition can have a water content of 0.1 to 5.0 wt %, more particularly 0.5-5.0 wt %, more particularly 1.0 to 4.0 wt %, more particularly 1.0 to 3.0 wt %, and more particularly still 1.0 to 2.0 wt %.

In accordance with the invention, microwave radiation is applied to an aqueous slurry, causing precursor compounds contained therein to react and form reaction flavours. Concomitantly, the heat generated by the microwave radiation dehydrates the slurry.

The temperature of the slurry is such as to cause the reaction flavour to form in a time scale during which the slurry also dehydrates to form the reaction flavour solid composition.

In an embodiment of the invention, the slurry may be heated to a temperature of 125° C., provided that the temperature of the slurry should not be at 125° C. for a period exceeding 12 hours.

In an embodiment of the present invention, the slurry may be heated to a temperature of 140° C. provided that the temperature of the slurry should not be at 140° C. for a period exceeding 4 hours.

In an embodiment of the present invention, the slurry may be heated to a temperature of 150° C. provided that the temperature of the slurry should not be at 150° C. for a period exceeding 2 hours.

In an embodiment of the present invention, the slurry may be heated to a temperature of 160° C. provided that the temperature of the slurry should not be at 160° C. for a period exceeding 1 hour.

In an embodiment of the present invention, the slurry may be heated to a temperature of 180° C. provided that the temperature of the slurry should not be at 180° C. for a period exceeding 15 minutes.

Depending on how the slurry is heated, its temperature can be controlled in order to mimic different types of cooking techniques, such as boiling, grilling, or roasting. The temperature should be controlled to ensure the desired flavour profile is created. Time is another important factor in the processing of slurries. If a slurry is not heated for a adequate time period, off-notes associated with unreacted precursor compounds, or over-roasted or even burnt notes can develop that can overpower other desired, more subtle notes.

Any reaction flavour can be generated by the methods of the present invention. Some of the most common reaction flavours include those that provide or contribute to red meat notes, poultry notes, vegetable notes, bread crust notes, chocolate notes, caramel notes, popcorn notes and fire roasted notes.

A particular feature of the present invention is that both the synthesis of the reaction flavour and its dehydration to form a reaction flavour solid composition occur essentially simultaneously in a single step process. It was entirely surprising that a process flavour could be formed, and not over-cooked, within the same time frame as the slurry is dehydrated to form the solid composition. However, the applicant found that this could be achieved by means of appropriate control of process variables.

In an embodiment of the invention, the slurry is heated for a period of time ranging from 1 to 15 minutes, more particularly 1 to 10 minutes, more particularly still from 1 to 7 minutes, and still more particularly 1 to 5 minutes. The temperature of the slurry during the period of heating may be up to 180° C.

In a more particular embodiment, the slurry may be heated to 100° C. for a period of time to drive off most of the water by evaporation. The period of time will depend upon the water content of the slurry, but typically can range from about 1 to about 5 minutes.

Thereafter, the temperature of the slurry may be increased to 130, 140, 150 160 or 180° C. for a period of time both to complete formation of the reaction flavour, as well as to drive off any remaining water to complete the dehydration. A suitable time period may be as little as 10 seconds, up to 1 minute, up to 2 minutes, up to 3 minutes, up to 4 minutes, or up to 5 minutes.

The reaction flavour solid composition can be cooled by switching off the microwave power supply, or by removing it from the microwave oven.

Heating of the slurry may be undertaken at ambient pressure, or under vacuum. A vacuum of 100 mbar to 1 mbar is suitable in the exercise of the present invention.

In an embodiment of the invention, microwave radiation is applied to the slurry that is in the form of a film. The film may be formed by casting, pouring or pumping the slurry onto an evaporation surface.

The thickness of the film is selected having regard for considerations that the slurry must be dehydrated within a period of time in which the desired reaction flavour is developed. It is also necessary for the incident microwave radiation to penetrate the film to ensure efficient and even heating. The surface temperature of the film can be measured using standard infra-red sensors placed at intervals along the length of the evaporation surface.

Suitable film thicknesses fall within the range of about 0.1 to about 5.0 cm, more particularly 0.3 to 5.0 cm, more particularly 1.0 to 4.0 cm, and more particularly still 1.0 to 3.0 cm.

A typical apparatus for evaporating water from a film of slurry may comprise an evaporation surface upon which a film of the aqueous slurry may be cast, poured or pumped. The surface may consist of a tray, upon which the slurry is cast before the tray and slurry are placed into a microwave oven. Alternatively, the surface may be a belt upon which the slurry is cast, which can be fed through a microwave oven disposed in the path of the belt, and through which the belt moves, thereby to heat the slurry for the time and at a temperature referred to hereinabove.

After passing through the microwave oven, the resultant reaction flavour solid composition may be presented in the form of a viscous paste, cake, ribbon, or the like.

At this stage, the reaction flavour solid composition may be subjected to further processing steps. For example, a reaction flavour solid composition in the form of a viscous paste may be subjected to a process of extrusion or moulding if it is desired to shape it, package it, or the like.

A reaction flavour solid composition in cake or ribbon form may be milled, ground and graded by sieving to render it in the form of a powder, granule or the like, having a desired particle size.

The viscosity of the aqueous slurry should be such as to be easily cast or pumped onto the evaporator surface, and be sufficiently immobile on the surface during processing.

A suitable viscosity would fall within the range of about 150 to 200,000 centipoise at room temperature, preferably 1'000 to 50'000 centipoise.

Any industrial microwave ovens may be employed in a method according to the present invention. Suitable microwave ovens include a 30 kW/915 MHz (50 kVA) up to 100 kW/915 MHz (150 kVA); or a 100 W/2450 MHz (0.15 kVA) up to 30 kW/2450 MHz (45 kVA).

Microwave energy input into the slurry—typically an aqueous slurry—may be typically in the range of 3-100 kW, or even higher, preferably 30-100 kW.

Aside from the water content of the slurry, which as stated above can be up to 50 wt %, the remaining mass of the slurry is comprised of reaction flavour precursor compounds, and any processing aids deemed necessary, such as proteins, or fragments of proteins, carbohydrates, fats and salts, and carriers.

Whereas fats and salts may be added to the slurry for the purpose of generating flavour, they may also aid in processing. For example, fats or oils ensure good heat dissipation throughout the slurry. The addition of salts can promote energy uptake into the slurry and increase the speed of heating.

Carriers may also be incorporated into the slurry. Carriers include fibrous materials and maltodextrins. They can help to ensure that the process flavour solid composition is obtained as dry powder, which in turn will facilitate any down-stream processing steps, such as milling and the like.

Precursor compounds that may be employed in the slurry are well known in the art, and they may vary, in a manner known to a skilled flavourist, depending upon the particular reaction flavour that it is desired to create. Precursor compounds include amino acids/amine sources (or their sources) and reducing sugars. The slurries may also include lipids or fats, spices and protein sources, such as hydrolyzed vegetable proteins (HVPs) or yeast autolysates.

In addition to these materials, the slurry may contain other materials that can modify taste or flavour, including sulphur sources, meat powders, powdered broths or stocks, and a fuller discussion of such ingredients is set forth hereinbelow.

Amino acid/amine sources may be selected from the group consisting of cysteine, methionine, alanine, glycine, lysine, arginine, histidine, tryptophan, proline, valine, glutamic acid, glutamine, aspartic acid, glutathione, other sulphur-containing peptides, HVP (groundnut, soybean wheat/maize gluten), other hydrolysed proteins (for example those that can be derived from milk, egg, fish, blood, liver, bone, collagen), yeast extract, autolysed yeast, meat extract, taurine and pyrrolidone carboxylic acid.

Reducing sugars are those that either have an aldehyde group or are capable of forming one in solution through isomerism. The aldehyde group allows the sugar to act as a reducing agent in the Maillard reaction, important in the browning of many foods. Cyclic hemiacetal forms of aldoses can open to reveal an aldehyde and certain ketoses can undergo tautomerization to become aldoses. Examples of reducing sugars include: glucose, fructose, xylose, glyceraldehyde, galactose, lactose, arabinose, maltose, glucose polymers such as starch, hydrolyzed starch, and starch-derivatives like glucose syrup, maltodextrin, and dextrin.

Sulphur sources may be selected from the group consisting of hydrogen sulphide, cysteine, cystine, methionine, glutathione, thaimin, inorganic sulphides, organic thiols and sulphides, 2-mercaptoethanol derivatives, e.g. mercaptoacetaldehyde and/or its dimer 2,5-dihydroxy-1,4-dithiane, 5-hydroxy-3-mercaptopentanone, 3-mercaptopropan-1-ol, 4,5-substituted thiazoles, thiocarbonates, thioamides, 2-mercaptoalkoanoic acids/amides, mercaptoalkylamines, aminosulphides, S-acetylmercaptosuccinic acid, vegetable extracts, fermented vegetable juices, yeast extract, autolysed yeast, egg protein and meat extract.

The ratio between an amino acid and a reducing sugar can vary within wide limits, for example a typical ratio of amino acid to carbohydrate is 1:5 but this can deviate significantly, depending upon the effect that is desired to be achieved.

In an embodiment of the invention a reaction flavour solid composition will be the product of a slurry containing up to 30 wt % water; up to 70 wt % of protein; up to 6 wt % of reducing carbohydrate, such as reducing sugars; up to 4 wt % lipids; up to 20 wt % carrier.

In another embodiment of the invention a reaction flavour solid composition will be the product of a slurry containing up to 30 wt % water; up to 30 wt % salts; up to 35 wt % reducing carbohydrates, such as reducing sugars; up to 15 wt % lipids; up to 20 wt % amino acids; and up to 14 wt % carrier.

The pH of the slurry can be adjusted in the range of 0.5 to 8, more particularly 2 to 8, and more particularly still 4 to 8. Any food grade acids and bases can be used. Examples of the acids include lactic acid, phosphoric acid, acetic acid, citric acid, malic acid, tartaric acid, oxalic acid, tannic acid, caffeotannic acid, benzoic acid, butyric acid, and combinations thereof. Examples of bases include sodium hydroxide, sodium carbonate, potassium bicarbonate, and sodium acetate.

The reaction flavour solid compositions of the present invention may represent a complete flavour composition that may be blended with a food or beverage to impart flavour thereto, or modify or improve the flavour thereof. Alternatively, the reaction flavour solid composition may form only a part of a complete flavour composition, and the reaction flavour solid composition can be mixed with other flavour ingredients to form the complete flavour composition.

A skilled flavourist will be able to mix a reaction flavour solid composition of the present invention with other known ingredients employed in flavour compositions to develop a wide variety of complete flavour compositions to satisfy the requirements of the food and beverage industry.

Those other known ingredients useful in complete flavour compositions may be added to the slurry before the formation of the reaction flavour solid composition, or they may be blended with a reaction flavour solid composition after it is formed, or both.

A complete flavour composition may comprise a reaction flavour solid composition as described herein; aroma volatiles and other flavour ingredients generally known in the art; and other synergists or enhancers, such as fats or fatty acids, or their sources, herbs, spices and the like; pH regulators; inorganic salts; taste masking agents, taste sensates; vitamins; dyes; colourants; pigments, and the like.

Other ingredients include aldehyde and ketone sources, including acetaldehyde, propanal, butanal, methylpropanal, C3 to C5 alkanals, HVP, alpha diketones and sources thereof, including butanedione, pentane-2,3-dione, pyruvaldehyde, pyruvic acid, glyceraldehyde, glyoxal, dihydroxyacetone, alpha-ketobutyric acid, heptane-3,4-dione-2,5-diacetate, HMFone, HDFone, and related derivatives, ascorbic acid, 5-ketogluconic acid, cyclotene, maltol, lactic acid, glycolic acid, malic acid, tartaric acid, and protein hydrolysates.

Examples of flavour enhancers and their sources include MSG, IMP, GMP, yeast extract, autolysed yeast, HVP, 2-furfuryl-thioinosine-5'-phosphate, 2-allyloxyinosine-5'-phosphate, 2-(lower alkoxy) inosine-5'-phosphate, 2-benzyl-thioinosine-5'-phosphate, 4-glucosylgluconic acid, and cyclotene.

Examples of pH regulators include mono-di- and tri-basic inorganic acids, such as HCl, sulphuric acid and phosphoric acid, organic acids, including succinic, citric, lactic, malic, tartaric, acetic and propanoic; amino acids, including valine, glycine and glutamic acids.

Examples of fats include fats of beef, chicken, coconut, other triglycerides, fatty acids, and their esters.

Examples of inorganic salts include chlorides and phosphates.

Depending upon the flavour profile that a skilled flavourist is trying to achieve, a complete flavour composition might additionally contain one or more of the following ingredients:

acetaldehyde (apple), dimethyl sulfide, ethyl acetate, ethyl propionate, methyl butyrate, and ethyl butyrate; flavour oils containing volatile aldehydes or esters include, e.g., cinnamyl acetate, cinnamaldehyde, citral, diethylacetal, dihydrocarvyl acetate, eugenyl formate, and p-methylanisole. Further examples of volatile compounds that may be present in the flavour oils include: benzaldehyde (cherry, almond); cinnamic aldehyde (cinnamon); citral, i.e., alpha citral (lemon, lime); neral, i.e., beta-citral (lemon, lime); decanal (orange, lemon); ethyl vanillin (vanilla, cream); heliotropine, i.e., piperonal (vanilla, cream); vanillin (vanilla, cream); alpha-amyl cinnamaldehyde (spicy fruity flavours); butyraldehyde (butter, cheese); valeraldehyde (butter, cheese); citronellal (modifies, many types); decanal (citrus fruits); aldehyde C-8 (citrus fruits); aldehyde C-9 (citrus fruits); aldehyde C-12 (citrus fruits); 2-ethyl butyraldehyde (berry fruits); hexenal, i.e., trans-2 (berry fruits); tolyl aldehyde (cherry, almond); veratraldehyde (vanilla); 2,6-dimethyl-5-heptenal, i.e., melonal (melon); 2-6-dimethyloctanal (green fruit); and 2-dodecenal (citrus, mandarin); cherry; or grape and mixtures thereof;

spice oleoresins derived from allspice, basil, capsicum, cinnamon, cloves, cumin, dill, garlic, marjoram, nutmeg, paprika, black pepper, rosemary, and turmeric, essential oils, anise oil, caraway oil, clove oil, eucalyptus oil, fennel oil, garlic oil, ginger oil, peppermint oil, onion oil, pepper oil, rosemary oil, spearmint oil, citrus oil, orange oil, lemon oil, bitter orange oil, tangerine oil, alliaceous flavours, garlic, leek, chive, and onion, botanical extracts, arnica flower extract, chamomile flower extract, hops extract, marigold extract, botanical flavour extracts, blackberry, chicory root, cocoa, coffee, kola, liquorice root, rose hips, sarsaparilla root, sassafras bark, tamarind and vanilla extracts, protein hydrolysates, hydrolyzed vegetable proteins, meat protein hydrolyzes, milk protein hydrolyzates and compounded flavours both natural and artificial including those disclosed in S. Heath, Source Book of Flavors, Avi Publishing Co., Westport Connecticut, 1981, pages 149-277;

valerian oil; 3,4-dimeth-oxyphenol; amyl acetate; amyl cinnamate, γ-butyryl lactone; furfural; trimethyl pyrazine; phenyl acetic acid; isovaleraldehyde; ethyl maltol; ethyl vanillin; ethyl valerate; ethyl butyrate; cocoa extract; coffee extract; peppermint oil; spearmint oil; clove oil; anethol; cardamom oil; wintergreen oil; cinnamic aldehyde; ethyl-2-methyl valerate; γ-hexenyl lactone; 2,4-decadienal; 2,4-heptadienal; methyl thiazole alcohol (4-methyl-5-β-hydroxyethyl thiazole); 2-methyl butanethiol; 4-mercapto-2-butanone; 3-mercapto-2-pentanone; 1-mercapto-2-propane; benzaldehyde; furfural; furfuryl alcohol; 2-mercapto propionic acid; alkyl pyrazine; methyl pyrazine; 2-ethyl-3-methyl pyrazine; tetramethyl pyrazine; polysulfides; dipropyl disulfide; methyl benzyl disulfide; alkyl thiophene; 2,3-dimethyl thiophene; 5-methyl furfural; acetyl furan; 2,4-decadienal; guiacol; phenyl acetaldehyde; β-decalactone; D-limonene; acetoin; amyl acetate; maltol; ethyl butyrate; levulinic acid; piperonal; ethyl acetate; n-octanal; n-pentanal; n-hexanal; diacetyl; monosodium glutamate; monopotassium glutamate; sulfur-containing amino acids, e.g., cysteine; hydrolyzed vegetable protein; 2-methylfuran-3-thiol; 2-methyldihydrofuran-3-thiol; 2,5-dimethylfuran-3-thiol; hydrolyzed fish protein; tetramethyl pyrazine; propylpropenyl disulfide; propylpropenyl trisulfide; diallyl disulfide; diallyl trisulfide; dipropenyl disulfide; dipropenyl trisulfide; 4-methyl-2-[(methylthio)-ethyl]-

1,3-dithiolane; 4,5-dimethyl-2-(methylthiomethyl)-1,3-dithiolane; and 4-methyl-2-(methylthiomethyl)-1,3-dithiolane.

Complete flavour compositions may contain taste masking agents. Taste masking agents are substances for masking one or more unpleasant taste sensations, in particular a bitter, astringent and/or metallic taste sensation or aftertaste, which substances can be a constituent of the products according to the invention. Examples include dihydrochalcones, nucleotides, sodium salts, hydroxyflavanones and the like.

Complete flavour compositions may contain taste sensates. Taste sensates include hot tasting, salivation-inducing substances, substances causing a warm or tingling feeling, and cooling active ingredients.

Examples of hot tasting and/or salivation-inducing substances and/or substances which cause a feeling of warmth and/or a tingling feeling on the skin or on the mucous membranes are: capsaicin, dihydrocapsaicin, gingerol, paradol, shogaol, piperine, carboxylic acid-N-vanillylamides, in particular nonanoic acid-N-vanillylamide, pellitorin or spilanthol, 2-nonanoic acid amides, in particular 2-nonanoic acid-N-isobutylamide, 2-nonanoic acid-N-4-hydroxy-3-methoxyphenylamide, alkyl ethers of 4-hydroxy-3-methoxybenzyl alcohol, in particular 4-hydroxy-3-methoxybenzyl-n-butylether, alkyl ethers of 4-acyloxy-3-methoxybenzyl alcohol, in particular 4-acetyloxy-3-methoxybenzyl-n-butylether and 4-acetyloxy-3-methoxybenzyl-n-hexylether, alkyl ethers of 3-hydroxy-4-methoxybenzyl alcohol, alkyl ethers of 3,4-dimethoxybenzyl alcohol, alkyl ethers of 3-ethoxy-4-hydroxybenzyl alcohol, alkyl ethers of 3,4-methylene dioxybenzyl alcohol, (4-hydroxy-3-methoxyphenyl)acetic acid amides, in particular (4-hydroxy-3-methoxyphenyl) acetic acid-N-n-octylamide, vanillomandelic acid alkylamides, ferulic acid-phenethylamides, nicotinaldehyde, methylnicotinate, propylnicotinate, 2-butoxyethylnicotinate, benzylnicotinate, 1-acetoxychavicol, polygodial and isodrimeninol.

Hot tasting natural extracts and/or natural extracts which cause a feeling of warmth and/or a tingling feeling on the skin or on the mucous membranes and which can be a constituent of a complete flavour composition are: extracts of paprika, extracts of pepper (for example capsicum extract), extracts of chili pepper, extracts of ginger roots, extracts of *Aframomum melgueta*, extracts of *Spilanthes-acmella*, extracts of Kaempferia galangal or extracts of Alpinia galangal.

As stated hereinabove, any one or a combination of these ingredients may be added to the slurry during reaction flavour formation, or they may be blended with the reaction flavour solid composition, once the latter is formed in accordance with a method according to the invention.

In addition to the aforementioned ingredients, a complete flavour composition may contain carrier materials. Carrier materials are employed, particularly when the reaction complete flavour composition is presented in the form of a powder, as flow aids, or extenders, or to provide physical stability to the powder by modifying the glass transition temperature (Tg) of the powder.

Suitable carriers which may be included as a component of the reaction flavour solid composition as such, or as a component in a complete flavour compositions include but are not limited to sugars, sugar derivatives, modified starches, proteins, alcohols, celluloses, dextrins, gums, sugar polyols, peptides, acids, carbohydrates, hydrocolloids. Particular examples of suitable materials include sugars such as gum arabic, capsul, maltose, sucrose, glucose, lactose, levulose, trehalose, fructose, ribose, dextrose, isomalt, sorbitol, mannitol, xylitol, lactitol, maltitol, pentatol, arabinose, pentose, xylose, galactose; hydrogenated starch hydrolysates, inulin, oligosaccharides such as oligo fructose; maltodextrins or dextrins (i.e., soluble fiber); modified starch; sugar fruit gran; corn syrup solids; sugar white gran; hydrocolloids such as agar, gum acacia, modified gum acacia, sodium alginate, potassium alginate, ammonium alginate, calcium alginate or carrageenan; gums; polydextrose; celluloses such as sodium carboxymethylcellulose, enzymatically hydrolyzed carboxy methyl cellulose, methyl cellulose, hydroxypropyl cellulose and hydroxypropyl methyl cellulose; proteins such as gelatine, pea protein, soy and whey protein isolates and hydrolyzates, and sodium casemates; silicon dioxide; and derivatives and mixtures thereof.

Carriers may be employed in complete flavour compositions in amounts of 5 to 25 wt % based on the dry weight of the reaction flavour solid composition.

Within the scope of this invention are foods or beverages containing a reaction flavour solid composition of this invention, alone or as a part of a complete flavour composition.

A feature of the present invention is that the reaction flavour solid composition is a product that is formed externally of a food or beverage matrix. It is an article of manufacture that can impart to, or modify or improve the flavour of a food or beverage, either alone or as part of a complete flavour composition, by virtue of it being mixed with or applied to a food or a beverage. The reaction flavour solid composition is not formed in or on a food or beverage matrix whilst the food or beverage is in the process of being heated or cooked Although the amount of a particular reaction flavour solid composition employed in a food or beverage will be dependent upon the intended application and effect that is desired to be achieved, generally, an amount of 0.1 to 1% by weight and preferably, about 0.1 to 0.5% by weight is appropriate to impart a desirable flavour and/or aroma to a food or beverage, or modify or improve the flavour and/or aroma of a food or beverage.

Examples of foods or beverages include baked products, snack foods, cereal products, alcoholic and non-alcoholic beverages, spice blends, ready-to-heat foods, ready-to-eat meals, dairy products, meat products, seasoning preparations, ketchup, sauces, dried vegetables, soups, bouillon, noodles, frozen entrees, gravy, and desserts.

Reaction flavour solid compositions of the present invention can make a general improvement to the flavour of foods or beverages. The reaction flavour solid compositions may be added to a food or beverage by simple mixing with other ingredients in the final blending of a food or beverage, such as a convenience food. Alternatively, the reaction flavour solid composition may be added to the outside of a food or beverage, for example, the process of dusting or spray coating a snack food. Still further, the reaction flavour solid composition may be added to a food or beverage during its formation, in a process which is sometimes referred to as internal flavouring.

The reaction flavour solid compositions of the present invention are well-suited for use, without limitation, in the following products:

Confectioneries, preferably selected from the group consisting of chocolate, chocolate bar products, other products in bar form, fruit gums, hard and soft caramels and chewing gum;

Baked products, preferably selected from the group consisting of bread, dry biscuits, cakes and other cookies;

Snack foods, preferably selected from the group consisting of baked or fried potato chips or potato dough products, bread dough products and corn or peanut-based extrudates;

Cereal products preferably selected from the group consisting of breakfast cereals, muesli bars and precooked finished rice products;

Alcoholic and non-alcoholic beverages, preferably selected from the group consisting of coffee, tea, wine, beverages containing wine, beer, beverages containing beer, liqueurs, schnapps, brandies, sodas containing fruit, isotonic beverages, soft drinks, nectars, fruit and vegetable juices and fruit or vegetable preparations; instant beverages, preferably selected from the group consisting of instant cocoa beverages, instant tea beverages and instant coffee beverages;

Spice blends and consumer prepared foods, including powder gravy, sauce mixes, condiments and fermented products;

Ready-to-heat foods: ready meals and soups, preferably selected from the group consisting of powdered soups, instant soups, precooked soups;

Dairy products milk products, preferably selected from the group consisting of milk beverages, ice milk, yogurt, kefir, cream cheese, soft cheese, hard cheese, powdered milk, whey, butter, buttermilk and partially or fully hydrolyzed milk protein-containing products Flavored milk beverages;

Soya protein or other soybean fractions, preferably selected from the group consisting of soya milk and products produced therefrom, soya lecithin-containing preparations, fermented products such as tofu or tempeh or products produced therefrom and soy sauces;

Meat products, preferably selected from the group consisting of ham, fresh or raw sausage preparations, and seasoned or marinated fresh or salt meat products;

Eggs or egg products, preferably selected from the group consisting of dried egg, egg white and egg yolk and oil-based products or emulsions thereof, preferably selected from the group consisting of mayonnaise, remoulade, dressings and seasoning preparations; and Fruit preparations, preferably selected from the group consisting of jams, sorbets, fruit sauces and fruit fillings; vegetable preparations, preferably selected from the group consisting of ketchup, sauces, dried vegetables, deep-frozen vegetables, precooked vegetables, vegetables in vinegar and preserved vegetables.

The invention is described in greater detail by the following non-limiting examples.

Example 1

A mixture (Sample 1) was prepared and processed following the procedure below:

To 165 g water in a glass beaker, a protein source (220 g), amino acids (33 g), a reducing carbohydrate source (55 g), caustic (16.5 g, 1 N) and beef fat (60.5 g) were added under vigorous stirring to the point where a homogenous suspension formed. The free flowing slurry was then poured in a crystallisation dish and submitted to microwave irradiation (e.g. 600 W, 7 minutes, 2450 MHz. atmospheric pressure). Shortly after switching on the microwave the water started to boil and frothing was observed. After evaporation of the water fraction the temperature increased further. Upon reaching the peak temperature of 145° C. microwave power was switched off. The glassy material was allowed to cool to ambient temperature. The solidified material (1-3% moisture) was coarsely crushed before fine milling to 300-2000 μm.

Preparation of a Comparative Sample Using a Conventional Batch Reactor

The materials mentioned above in the preparation of Sample 1 were processed in a closed, conventional, double-jacketed glass reactor (volume of 1 litre) equipped with an anchor stirrer and temperature sensor. After establishing a suspension of the starting materials at 50° C., the slurry was heated to 115° C. within 70 minutes. After reaching 115° C., the slurry was kept at this temperature for 65 minutes (pressure build up was observed: 1.5 bar). After the reaction the batch was cooled down to 50 again within 40 minutes. The resulting liquid was blended with an amount of carrier and was subsequently spray dried on a Niro Minor type spray tower.

Evaluation of Sample 1 and Comparative Sample

Sample 1 was evaluated by trained panellists alongside a comparative sample containing identical ingredients but which was prepared in a conventional batch reactor with anchor stirrer followed by subsequent spray drying of the reaction slurry. Results of the evaluation are provided below:

The Sample 1 was determined to be approximately twice the strength of the comparative sample. Furthermore, it was considered to have a more intense and complex flavour that was more reminiscent of flavours obtained by cooking techniques. By comparison, the comparative sample was deemed to be less authentic

Example 2

A mixture (Sample 2) was prepared and processed following the procedure below:

In a preparation tank 472 g drinking water was mixed with 400 g of a yeast extract, 70 g vegetable oil and 15 g amino acids. After forming a homogenous slurry, 25 g were poured onto a crystallisation dish (3-5 mm layer thickness). The slurry was microwave treated at 800 W for 6 minutes at atmospheric pressure. First frothing of the slurry was observed immediately after reaching boiling temperature of water and after evaporation of the water fraction, the reaction foamed a second time and ultimately solidified (Maximum temperature at the point power was switched off: surface temperature was 148° C. (IR), 161° C. inside (Pt 100 standard resistance thermometer). The final water content of the sample was 1.5-2.5 wt %. After cooling for 4 minutes, the resulting brittle product was ground with a mortar and pestle. The resulting powder particle size was 300-2000 μm. The resulting powder was stable and free flowing over a test period of 6 months at ambient temperature.

A comparative product was prepared in a batch reactor using the materials employed in the preparation of Sample 2. The materials mentioned above were processed in a closed, conventional, double-jacketed glass reactor (volume of 1 litre) equipped with an anchor stirrer and temperature sensor. After establishing a suspension of the starting materials at 50° C., the slurry was degassed to prevent excessive foaming during reaction. Then the slurry was heated to 105° C. over a period of 55 minutes. After reaching 105° C. the slurry was kept at this temperature for 135 minutes (pressure build up was observed: 0.6 bar). After the reaction the batch was cooled down to 50° C. again over a period of 35 minutes. The resulting liquid was blended with a carrier and was subsequently spray dried on a Niro Minor type spray tower.

Sample 2 was evaluated by trained panellists alongside the comparative sample containing identical ingredients but which was prepared in a conventional batch reactor with anchor stirrer followed by subsequent spray drying of the reaction slurry. Results of the evaluation are provided below:

Sample 2 provided a novel and complex character with strong roasted and pronounced animal species specific attributes, whereas in the comparative product yeast character dominated. Sample 2 was considered to provide a more authentic flavour reminiscent of flavours obtained by conventional cooking techniques, whereas the comparative sample by contrast was considered to be less authentic.

Example 3

In an adequate preparation tank, a suspension of 41 g fruit syrup, 19 g L-proline (0.17 mol), and 15 g Na-citrate (0.06 mol) were prepared. After adding 27 g maltodextrin, the obtained slurry was subjected to microwave processing (2 minutes at 800 W followed by 3 minutes at 300 W). Significant foaming was observed. Maximum temperature was measured by IR as 111° C. While cooling, the hot, viscous mass solidified. A dry, foamed, brittle material was obtained, which was milled (Retsch ZM100, Germany) under controlled atmosphere. The water content measured as 2.3% (Moisture Analyser HB43, Mettler-Toledo, Switzerland).

Functional organoleptic comparison of the microwave processed product with a conventionally, water based, batch processed alternative (spray dried after processing) allowed a 7-fold dosage reduction of the microwave processed product to provide equal functional performance in a bouillon type tasting base.

The invention claimed is:

1. A process of preparing a reaction flavour solid composition comprising the step of heating an aqueous slurry containing reaction flavour precursor compounds using microwave radiation to form a reaction flavour and concomitantly drying the slurry to form a reaction flavour solid composition, wherein the aqueous slurry is cast on a belt, which can be fed through a microwave oven disposed in the path of the belt and through which the belt moves, wherein the slurry is heated for a period of time ranging from 1 to 15 minutes, and wherein the slurry is heated to about 100° C. for a period of time to evaporate off most of the water, before heating the slurry to a temperature of up to 125° C.

2. The process according to claim 1, wherein the water content of the aqueous slurry is 10-50 wt % of the total weight of the slurry.

3. The process according to claim 1, wherein the water content of the reaction flavour solid composition is 0.1 to 5 wt %, based on the total weight of the reaction flavour solid composition.

4. The process according to claim 1, wherein the slurry is heated to a temperature of about 100° C. for a period of one to five minutes.

5. The process according to claim 1, wherein the slurry is heated at ambient pressure or under a vacuum.

6. The process according to claim 1, wherein the slurry is in the form of a film having a thickness between 0.1 and 5.0 cm.

7. The process according to claim 1, wherein the slurry has a viscosity of 1,000 to 50,000 centipoise at room temperature.

8. The process according to claim 1, wherein the microwave energy input into the slurry is in the range of 3-100 kW.

9. The process according to claim 1, wherein the slurry is free of carrier materials.

10. A reaction flavour solid composition prepared by the process of claim 1.

11. A food or beverage comprising the reaction flavour solid composition as defined in claim 10.

12. A method of imparting flavour to a food or beverage, or of modifying or improving the flavour of a food or beverage, said method comprising the step of adding to said food or beverage the reaction flavour solid composition as defined in claim 10.

\* \* \* \* \*